(12) United States Patent
Foley et al.

(10) Patent No.: US 8,068,448 B1
(45) Date of Patent: Nov. 29, 2011

(54) APPARATUS, SYSTEM, AND COMPUTER PROGRAM FOR SYNCHRONIZING COMMUNICATIONS

(75) Inventors: Conor Foley, Sterling, VA (US); Venugopal Eyyunni, Centreville, VA (US)

(73) Assignee: VT iDirect, Inc., Herndon, VA (US)

( * ) Notice: Subject to any disclaimer, the term of this patent is extended or adjusted under 35 U.S.C. 154(b) by 1122 days.

(21) Appl. No.: 11/764,004

(22) Filed: Jun. 15, 2007

(51) Int. Cl.
*H04B 7/22* (2006.01)

(52) U.S. Cl. ...... 370/324; 370/316; 455/12.1; 455/13.1; 455/13.2

(58) Field of Classification Search .................. 455/12.1, 455/8, 71, 427; 370/321
See application file for complete search history.

(56) References Cited

U.S. PATENT DOCUMENTS

| | | | | |
|---|---|---|---|---|
| 4,449,830 A | * | 5/1984 | Bulgier | 368/119 |
| 4,947,451 A | * | 8/1990 | Nawata | 455/8 |
| 5,471,657 A | * | 11/1995 | Gharpuray | 455/12.1 |
| 5,757,784 A | * | 5/1998 | Liebowitz et al. | 370/321 |
| 6,356,740 B1 | * | 3/2002 | Malcolm et al. | 455/71 |
| 7,706,754 B2 | * | 4/2010 | Krasner | 455/75 |
| 2002/0013149 A1 | * | 1/2002 | Threadgill et al. | 455/427 |
| 2005/0147196 A1 | * | 7/2005 | Quilter et al. | 375/356 |

OTHER PUBLICATIONS

U.S. Appl. No. 11/763,986, filed Jun. 15, 2007, Eyyunni et al.
U.S. Appl. No. 11/764,020, filed Jun. 15, 2007, Foley et al.

* cited by examiner

*Primary Examiner* — Lester Kincaid
*Assistant Examiner* — Isaak R Jama
(74) *Attorney, Agent, or Firm* — Oblon, Spivak, McClelland, Maier & Neustadt, L.L.P.

(57) ABSTRACT

A satellite communication system includes a hub, a repeater, a scheduling unit, and a remote. The scheduling unit is configured to synchronize a communication of the system based on an elapsed time between (i) an arrival at the remote of a downstream reference frame transmitted by the hub and retransmitted by the repeater, and (ii) an arrival at the remote of an upstream frame transmitted by the remote and retransmitted by the repeater.

29 Claims, 8 Drawing Sheets

APPARATUS, SYSTEM, AND COMPUTER PROGRAM FOR SYNCHRONIZING COMMUNICATIONS

BACKGROUND OF THE INVENTION

1. Field of the Invention

This invention relates in general to communication networks and in particular to an apparatus, system, and computer program for synchronizing communications in a satellite communications network by accurately determining an arrival time of a signal from a remote terminal.

2. Discussion of the Background

Geo-synchronous satellite communication networks have existed for decades in various topologies and using various methods for sharing a fixed bandwidth channel between multiple users (Pritchard, Wilbur L., and Joseph A. Scivlli, *Satellite Communication Systems Engineering*, Prentice-Hall, 1986, incorporated herein in its entirety by reference). As these networks evolved, Time Division Multiple Access (TDMA) and Frequency Division Multiple Access (FDMA) bandwidth sharing techniques, and bandwidth efficient Quadrature Phase Shift Keying (QPSK) modulation have become de facto standards for Layer 1 (physical layer) although many other techniques and modulations are used to some extent.

Pure TDMA mesh networks exist, in which all remotes (user nodes) take turns transmitting in a half duplex fashion. Pure FDMA point-to-point, or Single Channel Per Carrier (SCPC) networks, exist to allow full duplex transmission and reception. Many commercially viable network systems have evolved into a hybrid star topology, taking advantage of the broadcast nature of geo-synchronous satellites by using a SCPC downstream carrier from a central hub to all user nodes, and using one or more TDMA upstream(s) shared by all user nodes to communicate with the hub.

Conventional satellite communication networks include a central control server 10 (hub) and a plurality of remote terminals 14 (remotes) that exchange information via a geo-synchronous satellite 12 (satellite) as shown in FIG. 1. The hub sends information to the remotes using Single Channel Per Carrier (SCPC) method and the remotes respond to the hub using Time Division Multiple Access (TDMA) method.

The hub includes a signaling protocol that conveys channel allocation assignments between all remotes and the hub to determine how many transmission opportunities to grant each remote during an upcoming time interval according to a set of pre-configured rules. A synchronization process guarantees that messages sent via this signaling protocol are received and applied by all remotes during the same time interval such that communication parameters may be changed at least as often as every time interval. The time intervals may be as short as 40 ms (plus processing delay) for real time operations.

A popular and simple implementation of the TDMA upstream channel is to use an ALOHA technique enabling any remote to transmit to the hub any time the remote has data to send and relying on the probability that no other remote chose to transmit at that time which would cause a collision. Once the demand for bandwidth exceeds a predetermined percentage of the upstream channel, a more complex methodology is required to schedule TDMA bursts so that collisions are prevented.

However, because the satellite is a "mirror" that redirects data coming from the remotes to the hub or viceversa, to synchronize communications it may be necessary that a time synchronization of the data coming from the plurality of remotes is achieved before that data arrives at the hub or otherwise the hub is not able to "understand" that data. In other words, in the TDMA method, different slots are allocated to each remote such that no two remotes send data to the hub at the same time.

Even with a control application that assigns to each remote unique slots in a frame for communicating with the hub, collision of data from multiple remotes arriving at the same time at the hub is possible. One cause of this collision is the fact that the physical movement of the geo-stationary satellite is not taken into account by the conventional control applications that determine and allocate the slots in the frame for each remote.

Although the satellites are geo-stationary, meaning that the satellites are relatively fixed above a particular position above the Earth, in reality, each geo-stationary satellite moves randomly inside an imaginary box having a size given by multiplying the distance from the ground to the satellite with an angle of 0.01° measured in radians. This movement of the satellite introduces unexpected and unaccounted delays, which might result in a loss of communication between the hub and the remotes.

FIG. 2 illustrates additional problems with conventional network communication methods, as recognized by the present inventors. This figure represents two timing scenarios, labeled as follows: No Synchronization, and Conventional Synchronization. In each scenario, HRxSOFn(ta) represents the nominal time a start of a data burst time frame (i.e. Start of Frame (SOF)) is received from remote "n," and $k_{max}*2$ represents the maximum variation of reception time, or tracking error, for the worst case remote, due to minor perturbations in the satellite position. The frame's relative frame sequence is "a."

In the No Synchronization scenario, SOFs are unconstrained and arrive at various times due to variations between the propagation delays of each remote. In the Conventional Synchronization scenario, a time $R_{cdn}$ (Remote Conventional Delay for User Node n) is added at each remote so that SOFs from all remotes are received synchronously to the Hub's transmit reference SOF.

The conventional approach synchronizes HRxSOFn of each remote, but arrival time variations resulting from satellite tracking errors disadvantageously results in some of HRxSOFn occurring during hub frame n and some of HRxSOFn occurring during hub frame n-1.

Further, in the conventional approach, $R_{cdn}$ is chosen to synchronize HRxSOFn with subsequent Hub transmit SOF, which results in simultaneous arrival of SOFs sent at different times in the frame sequence. Thus, data bursts arriving at the Hub cannot be assumed to have all been sent during the same frame time, thereby complicating network control methods and increasing response time to control commands sent from the Hub. In addition, neither approach takes into consideration the movement of the satellite relative to the hub and the remotes.

The industry is in need of a network system that combats these problems and enables standard off-the-shelf networking equipment using standard protocols to take advantage of a communication satellite's ability to reach remotes at extreme distances and in areas of the world where broadband terrestrial communication is not practical, irrespective of the delays introduced into the satellite communication network by various of its components or the movement of the satellite.

SUMMARY OF THE INVENTION

According to an aspect of the present invention, a satellite communication system includes a hub, a repeater, a scheduling unit, and a remote. The scheduling unit is configured to synchronize a communication of the system based on an elapsed time between (i) an arrival at the remote of a downstream reference frame transmitted by the hub and retransmitted by the repeater, and (ii) an arrival at the remote of an upstream frame transmitted by the remote and retransmitted by the repeater.

According to another aspect of the present invention a satellite communication system has a hub having a scheduling unit and configured to transmit a downstream reference frame, a satellite, and at least one remote. The satellite is configured to retransmit the downstream reference frame received from the hub to the at least one remote, and retransmit an upstream reference frame received from the at least one remote to the at least one remote and the hub, the scheduling unit or the at least one remote is configured to determine a remote time delay as a difference between (i) a time of arrival, at the at least one remote, of the downstream reference frame, and (ii) a time of arrival, at the at least one remote, of the upstream reference frame after being retransmitted by the satellite back to the at least one remote, and the scheduling unit or the remote is further configured to synchronize communications of the system based on the remote time delay.

According to another aspect of the present invention, a communication apparatus that communicates with at least one remote via a satellite, includes a transmitter configured to transmit a downstream reference frame, a receiver configured to receive an upstream reference frame, and a scheduling unit configured to determine a remote time delay as a difference between (i) a time of arrival, at the at least one remote, of the downstream reference frame, and (ii) a time of arrival, at the at least one remote, of the upstream reference frame after being retransmitted by the satellite back to the at least one remote. The scheduling unit is further configured to synchronize communications based on the remote time delay.

Still according to another aspect of the present invention, a computer readable media stores computer program instructions, which when executed by a computer cause the computer to transmit from a hub a downstream reference frame, retransmit, at a satellite, the downstream reference frame to at least one remote, and an upstream reference frame sent by the at least one remote to the at least one remote and the hub, receive at the at least one remote the downstream reference frame from the hub via the satellite, determine, at the hub or at the at least one remote, a remote time delay as a difference between (i) a time of arrival, at the at least one remote, of the downstream reference frame, and (ii) a time of arrival, at the at least one remote, of the upstream reference frame after being retransmitted by the satellite back to the at least one remote, and synchronize communications of the at least one remote to another remote based on the determined remote time delay.

BRIEF DESCRIPTION OF THE DRAWINGS

A more complete appreciation of the invention and many of attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
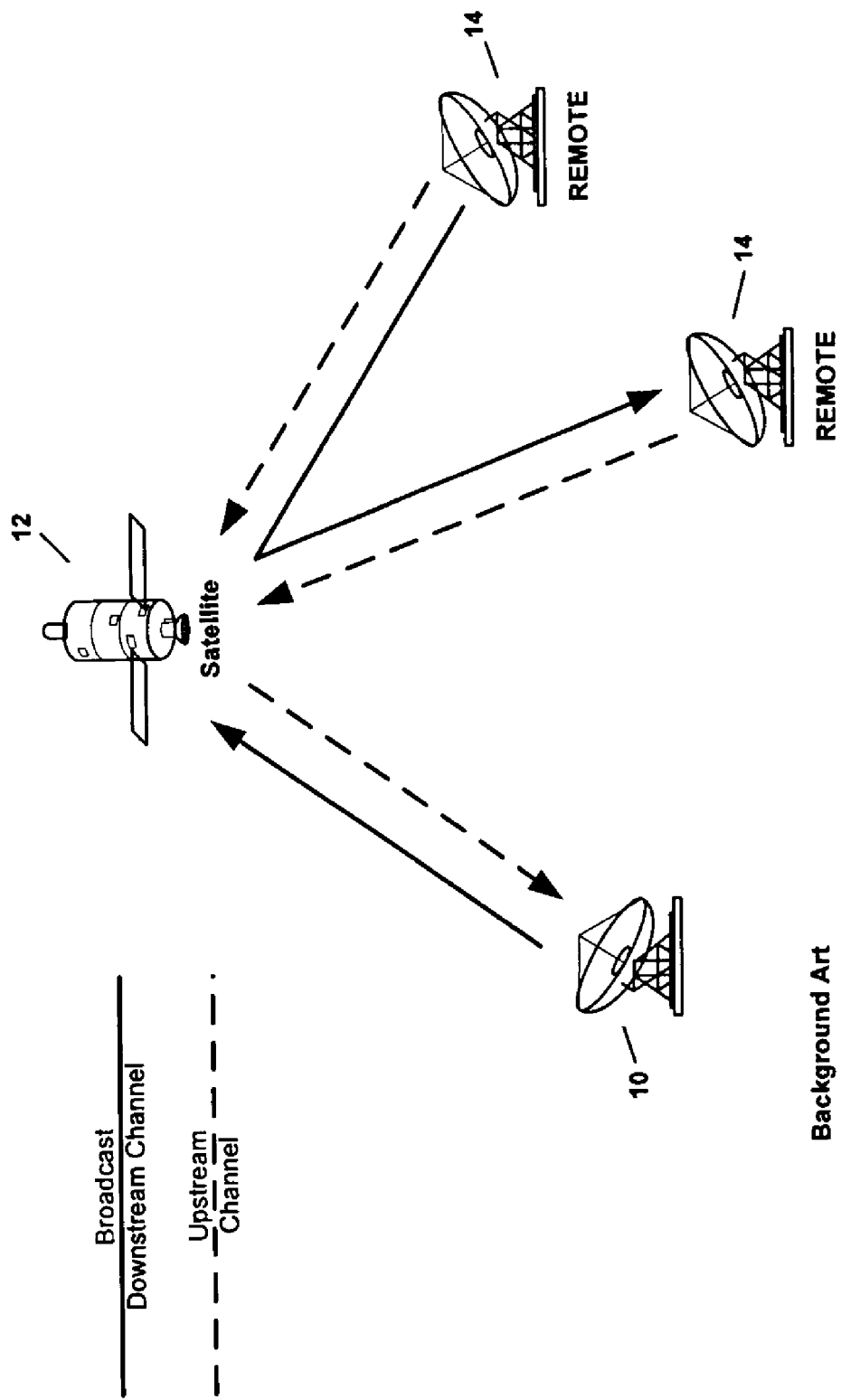
FIG. 1 illustrates a conventional communication network system.
Figure 2:
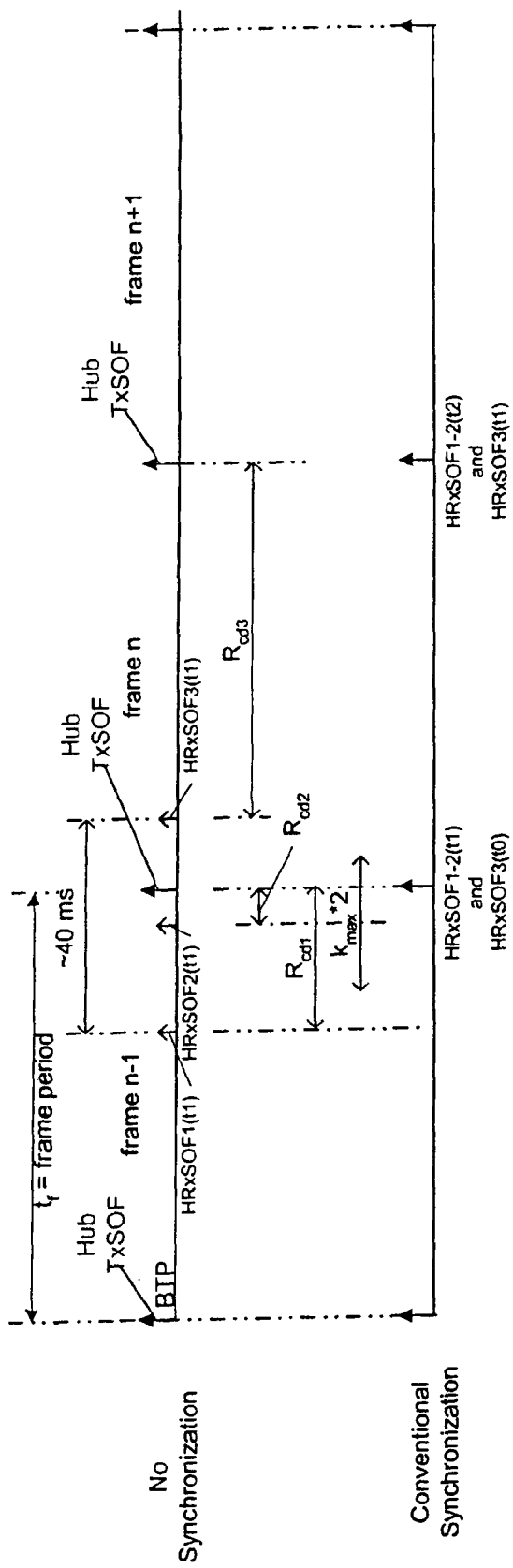
FIG. 2 is a timing diagram of a conventional communication network system.
Figure 3:
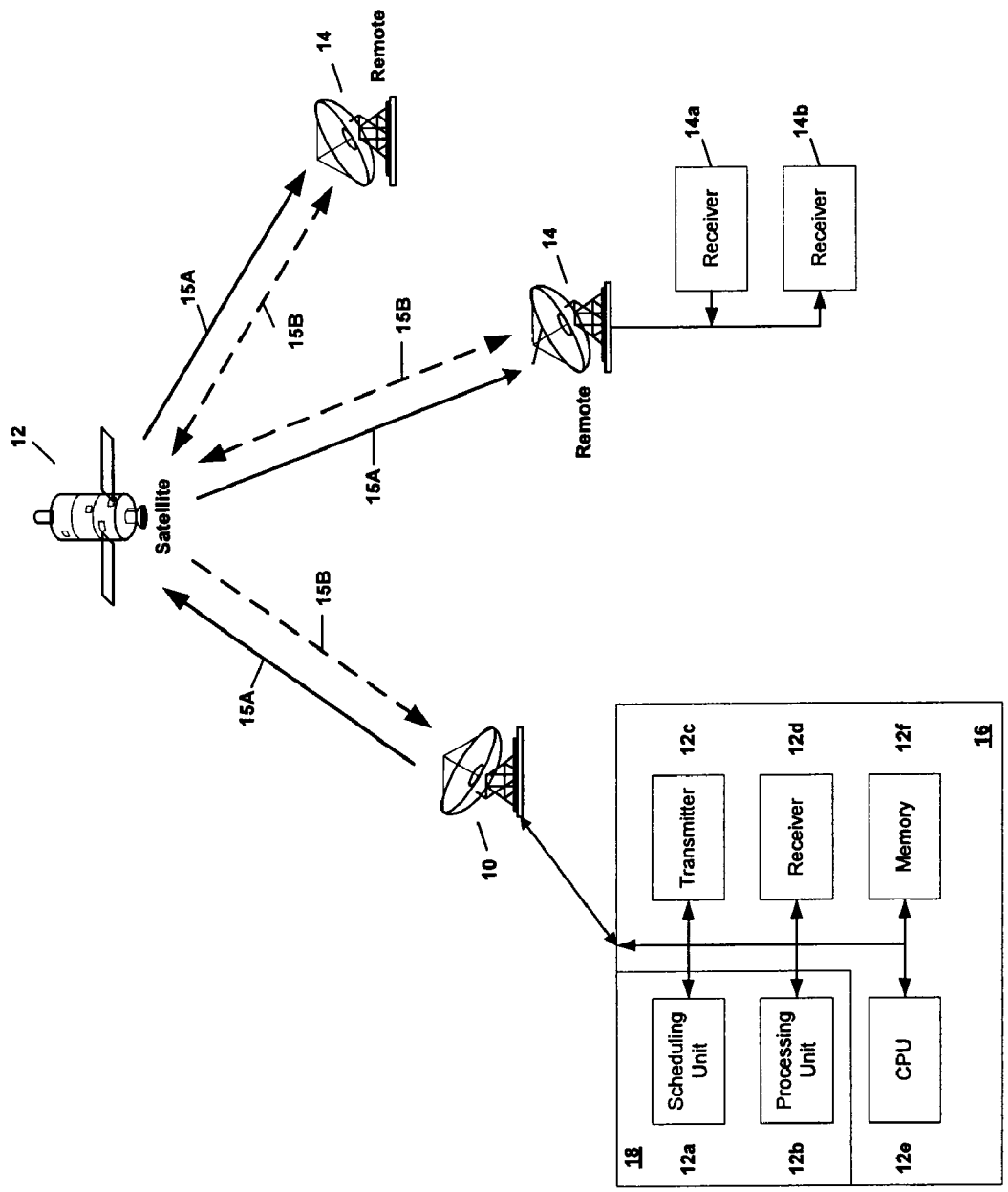
FIG. 3 illustrates a communication network system according to an embodiment of the present invention.

Referring now to the drawings, wherein like reference numerals designate identical or corresponding parts throughout the several views, FIG. 3 shows a satellite communication system including a central control server (hub) 10 which is connected via a satellite 12 to plural remote terminals 14 located at geographic sites within the reach of a beam of the single geo-synchronous satellite 12. The hub 10 includes in one embodiment at least a scheduling unit 12a, a processing unit 12b, a transmitter 12c, and a receiver 12d, as will be discussed next. Optionally, the hub 10 may include a microprocessor 12e and a memory 12f. All the above noted elements of the hub 10 may be connected to a common bus.

A downstream SCPC channel 15A is broadcast from the hub location and received by all remotes via the satellite. The remotes transmit bursts on one or more upstream TDMA channels 15B to be received by the hub or by other remotes. The remotes transmit in TDMA slots explicitly assigned by a central control server 16 of the hub 10 for a given time interval. The central control server 16 interacts with a protocol processor 18 for scheduling various communication parameters of the remotes and the hub.

The central control server, the protocol processor and other components of the hub and remotes may be implemented in corresponding microprocessors that are connected to a central microprocessor that manages the plurality of microprocessors. Alternatively, the components of the hub may be implemented as software codes in a computer or a microprocessor as will be understand by one of ordinary skill in the art from the following disclosure.

According to an exemplary embodiment, the hub may include a stand-alone line card (not shown) integrated into its own chassis, with a downstream carrier and an upstream carrier. The hub can be obtained from Idirect Technologies (13865 Sunrise Valley Dr, Herndon, Va. 20171-4661 US). For example, the hub can be a Private Hub, a Mini Hub-30, or a Mini Hub-15, all available from Idirect. According to one embodiment, the Hub can handle star, SCPC, and mesh satellite networks, and may have two demodulators, one modulator, one LAN port, eight switch ports, and may communicate with unlimited remotes. Also the hub may include plural transmitters 12c and plural receivers 12d. According to one embodiment, the remotes include a receiver 14A configured to search for a signal from the hub and a receiver 14B configured to search for a signal from a peer remote. Each remote also may include a TDMA transmitter (not shown) for transmitting data to the hub or to the peer remote.

The above mentioned exemplary embodiment is provided only for illustrating one possible hub and remote and is not intended to limit the present invention to the hub/remote described above. The apparatus, system, and computer program of the present invention are applicable to any satellite network including hubs, satellites and remotes.

Still for exemplary purposes, a line card that is part of the hub may include the iNFINITI MODI-NB line card or iNFINITI MIDI, both provided by iDIRECT Technologies.

Figure 4:
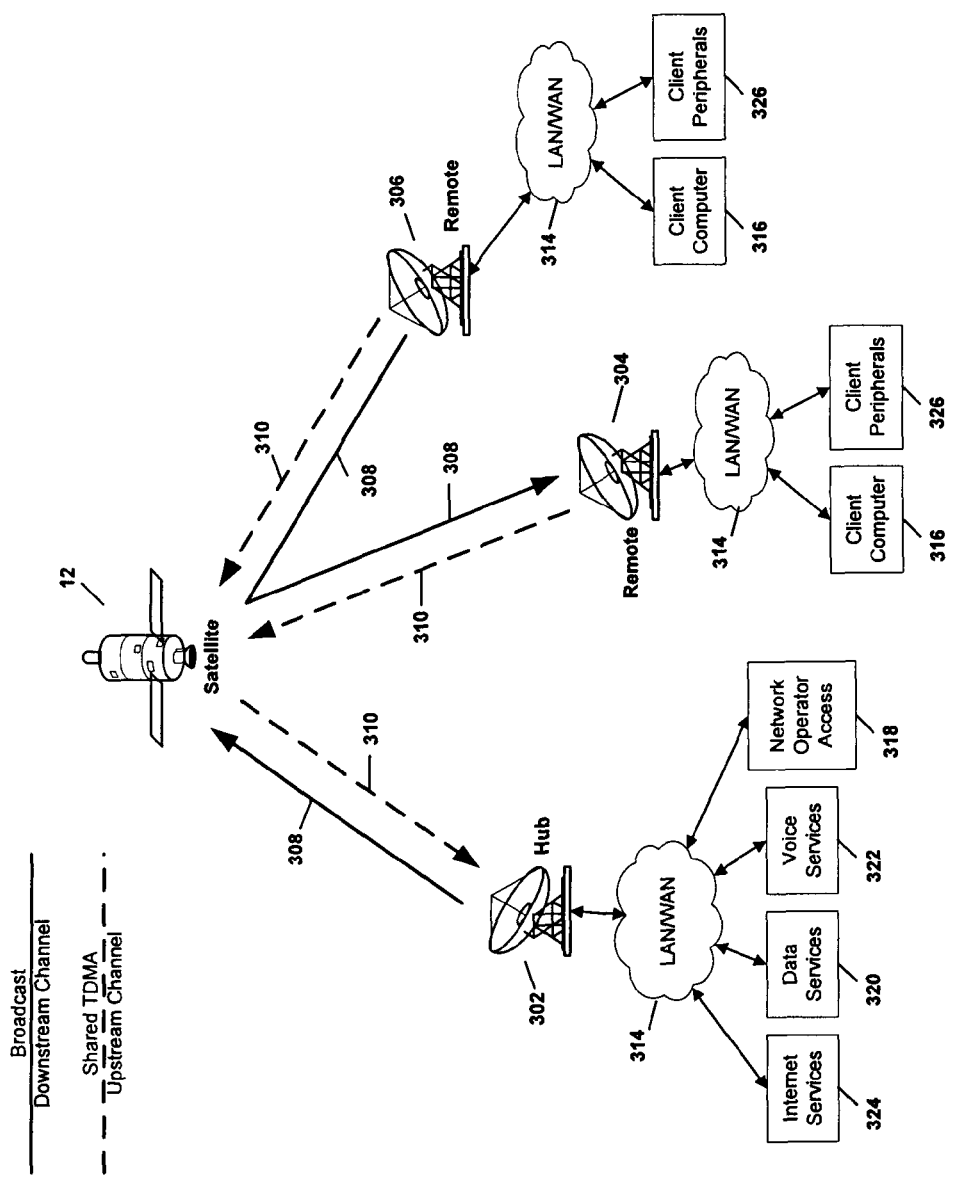
FIG. 4 illustrates a communication network system according to an embodiment of the present invention.

For example, an embodiment of the present invention may be used by a business with remotely located organizations or users that otherwise have no conventional means of accessing the global internet or an intranet. As shown in FIG. 4, client computers 316 connected to a remote 304 could include a single PC or an entire LAN/WAN with many PCs, VoIP equipment, videoconferencing equipment, web servers, or any other piece of equipment that can communicate directly or indirectly using IP packets over Ethernet. Network operators may, for example, use the present invention to provide satellite connectivity to these users. The network operator is responsible for administering at least the satellite portion of the network. The operator has special access to the central control server 16, which configures, monitors, and controls the network. Network control tasks may include adding and removing user nodes 304, and changing data rate and QoS parameters, etc.

An example of a hub installation according to an embodiment of the present invention includes a router connected to the central control server 16 (see FIG. 3) and, via the LAN/WAN 314 (see FIG. 4) and internet service devices 324, connected to the global internet. This example configuration allows client computers 316 to access the internet over the satellite link by designating the IP default gateway of each of the client computers 316 as the remote's IP address. This causes any packets generated at the user node's LAN/WAN 314 destined for IP addresses that are not local to be forwarded to the satellite router and over the air to the hub 302. Similarly, the default gateway of the central control server 16 is set for the router connected to the global internet. This causes packets that arrive at the hub 302 with IP addresses not matching any of the subnets on the satellite network to be forwarded to the router and then on to the global internet.

All traffic in a star network passes through the hub, even if the traffic is destined for another remote in the same network. By adding a mesh overlay to the star configuration, remote-to-remote traffic is allowed to bypass the hub and pass directly between the remotes sites. However, the network has to synchronize signals exchanged between the remotes in order to enable reliable and accurate remote-to-remote traffic, as will be described next.

Mesh-enabled remotes continue to be part of an underlying star network. Traffic destined for the hub or for other networks is received and routed by the hub. However, unlike the non-mesh remotes, which receive only the downstream SCPC carrier from the hub, mesh-enabled remotes also receive the TDMA upstream carrier used by all mesh remotes in the network. This allows the destination remote to directly receive the mesh traffic from other mesh remote transmitting on the upstream carrier.

In a mesh network, the hub also receives its own downstream carrier. Receiving the own downstream carrier forms a loopback that enables the hub to accurately determine the arrival time of a signal from a remote in the mesh network as discussed next.

An Uplink Control process (UC) constantly monitors channel assessments made by the hub receiver every time a packet is received, sorts the assessments by remote, and makes a decision as to whether a remote should modify its frequency offset, symbol timing offset, transmit power, modulation, or FEC code in order to maintain channel quality as good or better than a threshold bit error rate (BER). In one embodiment, the UC process may be performed by the central control unit 16. Alternately, the UC may periodically monitor channel assessments made by the hub when some packets are received.

To enable the UC process to react to changing channel conditions, a synchronous Burst Time Plan (sBTP) may be employed in one embodiment. Alternatively, other traditional time plans may be used. The sBTP ensures that the propagation delay is an exact integer number of time intervals for all remote-to-hub paths. This enables time slots, modulation, and FEC to be changed every time interval even though that time interval is much shorter than the propagation delay between the hub and the remotes.

To synchronize remotes to the hub it may be desirable that the round trip delay between each hub/remote pair is equal to a common integer number of frame lengths. The frame length is arbitrary, however, it has certain minimum requirements as discussed later and its duration in time can influence system performance. All remotes receive the BTP and apply it in a manner that no two remotes "stamp" on one another when data arrives at the satellite (or HUB receiver). These two aspects can be satisfied by generating a system timing reference at the hub transmitter (HUB TxSOF) and applying offsets at the hub receivers (Hfsd—hub frame start delay) and remotes (Rfsd) to this reference. Each remote has its own Rfsd based on its geographic location. In order to provide the maximum amount of time for the remotes to process the BTP, these offsets may be applied optimally.

A full disclosure of the sBTP and the system timing reference at the hub have been presented in patent application Ser. No. 10/721,419, filed on Nov. 26, 2003, and assigned to Idirect Technologies, also the assignee of this application. The entire contents of the Ser. No. 10/721,419 are incorporated herein by reference. Thus, those details relating to the frame and symbol synchronization disclosed in Ser. No. 10/721,419 are omitted herein.

The present inventors have determined that given the geographic locations of the hub, satellite and remotes, and the measurement of an appropriate time delay, it is possible to predict when a frame marker will arrive at each remote. With appropriate fixed delays at each remote (Rfsd), it is possible to control when a burst from each remote arrives at the satellite, and in turn at a hub receiver, assuming that the satellite is not moving relative to Earth. Synchronization of each remote to within a symbol period may be achieved. Frame synchronization in turn allows for BTP synchronization.

The time difference between a geosynchronous satellite and a remote closest to the satellite, and a satellite and a remote furthest (and in line of sight) from the satellite may be approximately 20 ms. However, if the satellite moves around a fixed position, this time varies accordingly, contributing to the loss of synchronization between the remotes.

According to one embodiment of the present embodiment, the schedule of the data transmitted from the remotes is not fixed but is dynamically calculated as will be discussed next.

Figure 5:
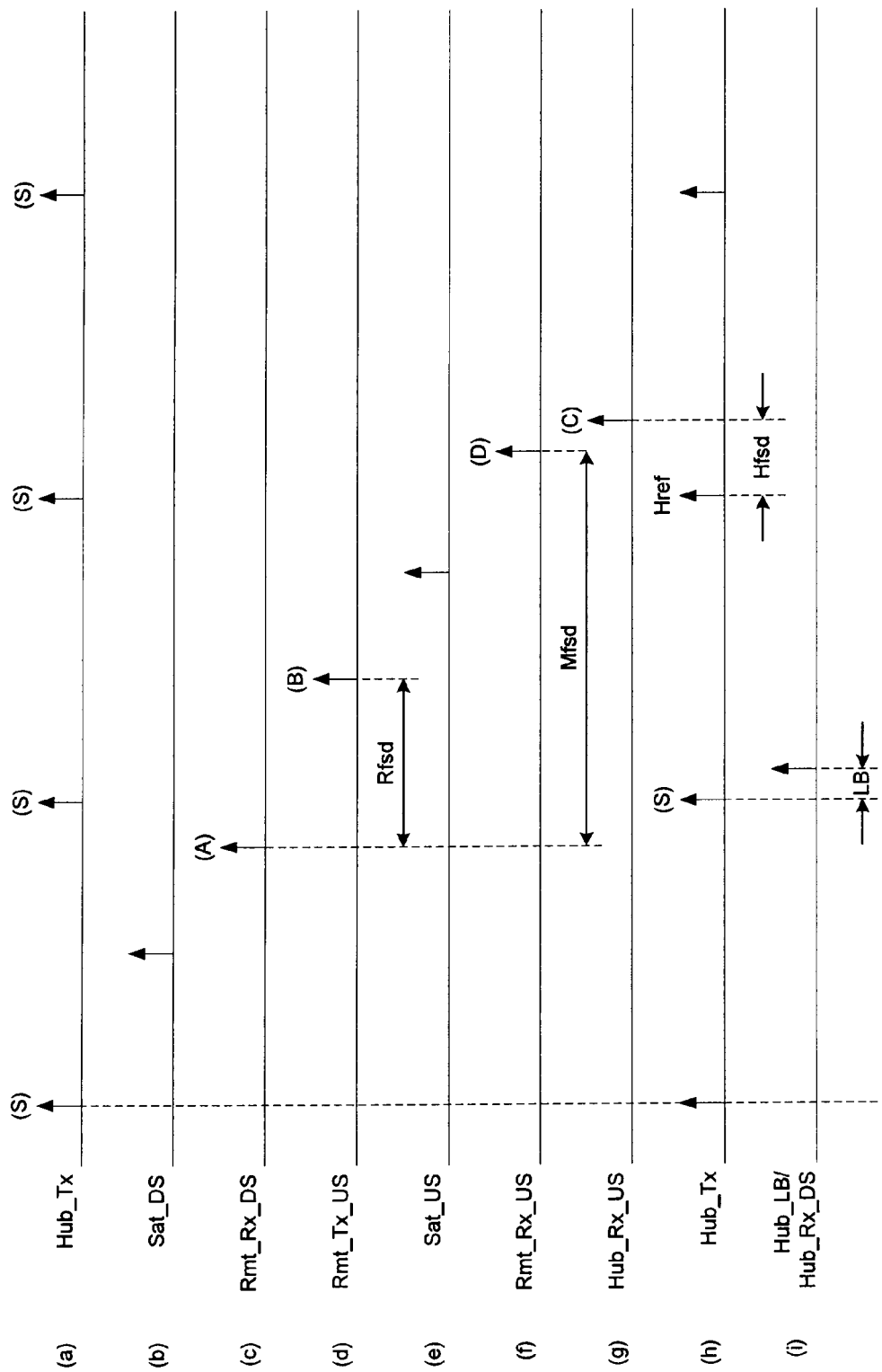
FIG. 5 is a timing diagram of a communication network system according to an embodiment of the present invention.

FIG. 5 shows a frame sync (S) that is generated by the hub and transmitted to each remote. The frame sync (S) is used as the reference time for all the remotes to communicate. In order to determine when a received upstream frame sync is expected to arrive at the remote relative to the frame sync on the remote, the following quantities are determined: (1) a roundtrip delay from the hub to the remote via the satellite and back to the hub, (2) a SCPC loopback for the hub (i.e., roundtrip hub-satellite-hub), and (3) a TDMA loopback for a remote (i.e., roundtrip remote-satellite-remote).

First, the roundtrip delay hub-satellite-remote-satellite-hub is calculated as being:

Roundtrip delay=integer number of frames+$H_{fsd}$, where $H_{fsd}$ is the time schedule delay of the hub, i.e., a time offset between a reference time Href of the transmitter of the hub (h) and a time of arrival at the remote of the signal transmitted by the hub (g). Thus, the roundtrip delay is:

$$t_{tx\_scpc\_gnd}+t_{h-s}+t_{s-r}+t_{rx\_scpc\_gnd}+R_{fsd}+t_{tx\_tdma\_gnd}+\\t_{s-r}+t_{h-s}+t_{rx\_tdma\_gnd}=nt_f+H_{fsd},$$

in which, $t_{tx\_scpc\_gnd}$ is the delay associated with the transmission from the hub in the SCPC channel, $t_{h-s}$ is the travel time from the hub to the satellite (b), $t_{s-r}$ is the travel time from the satellite to the remote (c), $t_{rx\_scpc\_gnd}$ is the delay associated with the reception of the signal from the hub at the receiver, $R_{fsd}$ is a delay associated with the remote (d), $t_{tx\_tdma\_gnd}$ is the delay associated with the transmission of the signal from the remote, $t_{s-r}$ is the travel time from the remote back to the satellite (e), $t_{h-s}$ is the travel time from the satellite back to the hub (g), $t_{rx\_tdma\_gnd}$ is the delay associated with the reception of the signal back to the hub, n is an integer, $t_f$ is the time period of a frame, and $H_{fsd}$ is the hub frame start delay (i).

The $H_{fsd}$ is calculated during initialization on the hub receiver using pre-configured hub and satellite locations, and frame rate. Each remote is pre-configured with its location, or determines its location from a GPS input. Frame rate, and other remote parameters, including upstream symbol rate, are sent to each remote via the downstream channel and stored at the respective remote before the remote acquires into the network. When each remote is instructed to acquire into the network, it is also informed of the $H_{fsd}$ (or of the variables needed to calculate it locally), the location of the satellite, and the location of the hub. The remote calculates an $R_{fsd}$ based on this information, prior to transmission. This method accommodates both static and mobile remotes, and the movement of the satellite—since the remote recalculates the $R_{fsd}$ each time the remote is instructed to acquire into the network.

With the $R_{fsd}$ applied at each remote, the start of all upstream frame times arrive simultaneously (i.e., within the ability of the hub demodulator to demodulate the burst within the same symbol time) at the satellite, and hence simultaneously at the hub receiver.

If the terms of equation (1) are rearranged, the following equation (2) is obtained:

$$(t_{tx\_scpc\_gnd}+t_{h-s}+t_{h-s}+t_{rx\_scpc\_gnd})+(t_{tx\_tdma\_gnd}+t_{s-r}+t_{s-r}+t_{rx\_tdma\_gnd})+R_{fsd}=nt_f+H_{fsd} \quad (2)$$

The SCPC loopback, which corresponds to a signal sent by the hub to the satellite and back to the hub, has the form:

$$t_{tx\_scpc\_gnd}+t_{h-s}+t_{h-s}+t_{rx\_scpc\_gnd}=mt_f+LB \quad (3)$$

with LB (i) being a delay from the transmission Hub_Tx_US on the line card to the detection of loopback Hub_Rx_US and m is another integer. The US symbol is used for upstream signals and the symbol DS is used for downstream signals, with the downstream signals sent by the hub and the upstream signals sent by the remotes. The SCPC loopback reflects the time necessary for a signal transmitted by the hub (SCPC) to the satellite and back to the receiver of the hub and is shown in FIG. 5 as LB in (i).

The TDMA Loopback, which corresponds to a signal in TDMA sent by the remote at (d), received by the satellite at (e), and received back by the remote at (f), has the form:

$$t_{tx\_tdma\_gnd}+t_{s-r}+t_{s-r}+t_{rx\_tdma\_gnd}=D_{fsd} \quad (4)$$

in which $D_{fsd}$ is a delay from the transmission (B) of a signal at a remote at (d) to the receiving (D) of the same signal at the same remote at (f). It is noted that $D_{fsd}$ is determined for each remote and this quantity may be different from remote to remote depending on the physical location of the remote relative to the satellite. The TDMA loopback reflects the time necessary for a signal transmitted by the remote (TDMA) to the satellite and back to the receiver of the same remote.

From equations (2) and (3) and (4)

$$(mt_f+LB)+M_{fsd}+R_{fsd}=nt_f+H_{fsd} \text{ and} \quad (5)$$

$$\begin{aligned}(6) \quad D_{fsd} &= nt_f + H_{fsd} - R_{fsd} - mt_f - LB \\ &= \mathrm{mod}((H_{fsd} - R_{fsd} - LB), \mathrm{sym\_per\_frame}).\end{aligned}$$

Alternatively, if $M_{fsd}$ is the delay measured at a receiver of the remote from the time a signal is received (A) at the remote until another signal is received (D) at the same remote, $$\begin{aligned}(7) \quad M_{fsd} &= nt_f + H_{fsd} - mt_f - LB \\ &= \mathrm{mod}((H_{fsd} - LB), \mathrm{sym\_per\_frame}),\end{aligned}$$

in which "mod" is the mathematical modulo operation and sym_per_frame is the number of symbols per frame.

Thus, by determining the delays $H_{fsd}$ and LB of the hub, the delay $M_{fsd}$ can be calculated. The delay $M_{fsd}$ is the same for each remote and is used by each remote to directly communicate with another remote. Further, the delay $M_{fsd}$ takes into account the movement of the satellite and permits the remote to accommodate for that movement. Furthermore, it is noted that according to one embodiment of the present invention, only the loopback of the hub LB and the start delay time at the hub $H_{fsd}$ are necessary for calculating the remote delay $M_{fsd}$.

For a better understanding of equations (1), (3) and (4), FIG. 5 illustrates on a time axis (horizontal axis) the instants at which receivers/transmitters of the hub and remotes receive/transmit signals. In the first graph (a), the transmitter of the hub continuously and at equal intervals transmits a reference frame Hub_Tx (shown as a vertical arrow). In the next graph (b), the satellite receives the downstream reference frame Sat DS from the hub and retransmits that frame to a remote.

In the next graph (c), the receiver of the remote receives the downstream reference frame Rmt_Rx_DS at time (A) from the satellite. After a delay Rfsd, the transmitter of the remote transmits the upstream reference frame Rmt_Tx_US at time (B) as shown in graph (d). The satellite receives the upstream reference frame in graph (e) and retransmits it in graph (g) to the receiver of the hub as the upstream reference frame Hub_Rx_US. The receiver of the hub receives the upstream reference frame at time (C) as shown in graph (g).

Also, the remote itself receives the upstream reference frame sent by the transmitter of the remote at time (D) as shown in graph (f), with the $M_{fsd}$ delay. The time delay between time (C) and Href of the transmitter of the hub is Hfsd as shown in graph (h). The receiver of the hub also receives the downstream reference frame initially transmitted by the transmitter of the hub, and this delay is shown in the graph (i) as LB.

In one embodiment, the calculated $M_{fsd}$ is used by a control application of the hub to inform each remote and the hub itself about the starting times/delays for each communication, i.e., remote to remote or remote to hub. In other words, at least a remote receives from the hub a frame start delay for transmitting information either to the hub or to a peer remote. In regard to this advantage of the present invention, it is noted that the conventional satellite communication systems ignore the movement of the satellite, and thus, no proper correlation is achieved for the remotes, resulting in loss of communication.

The frame start delay may be periodically calculated for each remote, either during each frame or each n-th frame, with n having a value between 2 and 10. In one embodiment, the $M_{fsd}$ delay is calculated at the remote. It is noted that the above equations take into account the movement of the satellite relative to its fixed position by calculating the loopback LB. Thus, the communication loss that occurs in the conventional satellite networks due to the movement of the satellite is prevented by using the satellite loopback.

The calculated $M_{fsd}$ delay corresponds to a time delay between the received upstream TDMA frame reference Rmt_Rx_US and the received downstream frame reference Rmt_Rx_DS. Based on this quantity, the remotes are able to synchronize information to be exchanged among themselves without transmitting that information to the hub.

Frame synchronization as detailed above provides the ability for bursts within a frame to be optimally used without a burst from one remote stamping (i.e., interfering with) on the burst of another remote on the same upstream. The synchronous broadcasting from the hub to all remotes is used to control which upstream, and which bursts within that upstream, are enabled for a specific remote.

Figure 6:
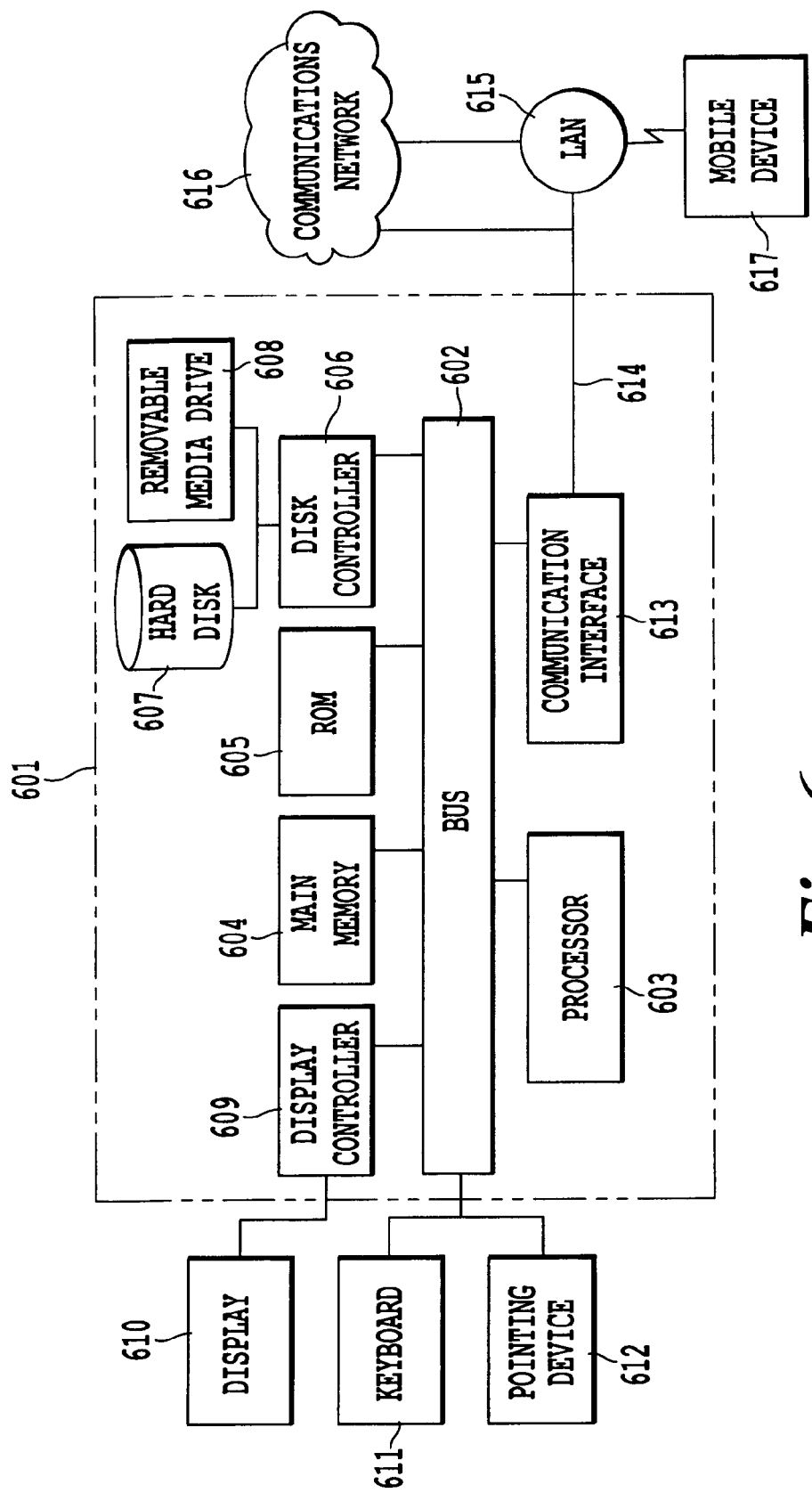
FIG. 6 is a block diagram of an exemplary hub according to an embodiment of the present invention.

An embodiment of the hub 10, illustrated in FIG. 3, includes a central control server 16, a more detailed example of which is shown in FIG. 6.

FIG. 6 illustrates a computer system 601 upon which an embodiment of a user node, or hub, of present invention may be implemented. The computer system 601 includes a bus 602 or other communication mechanism for communicating information, and a processor 603 coupled with the bus 602 for processing the information. The computer system 601 also includes a main memory 604, such as a random access memory (RAM) or other dynamic storage device (e.g., dynamic RAM (DRAM), static RAM (SRAM), and synchronous DRAM (SDRAM)), coupled to the bus 602 for storing information and instructions to be executed by processor 603. In addition, the main memory 604 may be used for storing temporary variables or other intermediate information during the execution of instructions by the processor 603. The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

Figure 7:
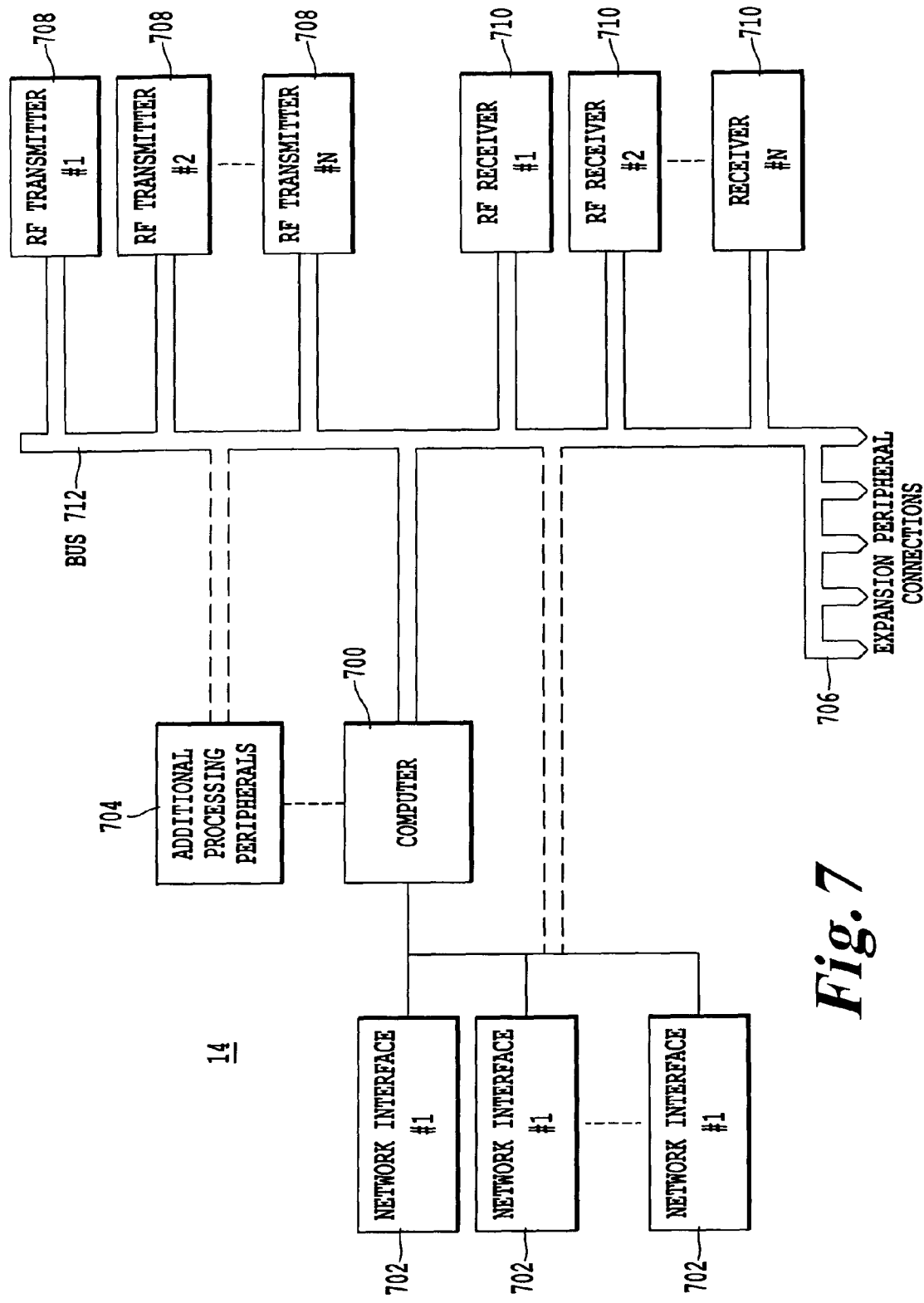
FIG. 7 is a block diagram of an exemplary remote according to an embodiment of the present invention.

FIG. 7 illustrates an example of an embodiment of a terminal 14 according to the present invention. In this example, the terminal 14 includes a computer 700 connected to a plurality of network interfaces 702. The computer 700 is a general purpose microprocessor based device including volatile and non-volatile storage and standard interfaces. The network interfaces 702 provide access to 10/100 Ethernet, RS-232, V.35, analog telephony, optical networks, gigabit Ethernet, USB, IEEE 1394, wireless LAN, and other networks. The computer 700 is also connected to optional additional processing peripherals 704 to provide additional processing resources such as encryption/decryption engines, data or voice compression devices, content addressable memory devices, video codecs and other functions that may be implemented in programmable logic or custom logic devices configured for custom processing purposes.

In addition, the computer 700 is connected through a bus 712 to a plurality of RF transmitters 708, RF receivers 710, and expansion peripheral connections 706. The RF transmitters and receivers provide a communication link to the satellite 12, and from there to the hub 10 and to other remotes 14. The expansion peripheral connections 706 provide optional connectivity to other devices compatible with the bus 712 such as storage devices, wireless LAN devices, sound or video cards, lottery systems, point of sale devices, public kiosks, information signs, public internet terminals, bus protocol converters, and other peripherals. Alternatively, the network interfaces may connect directly to the bus 712 instead of connecting to the computer 700.

Figure 8:
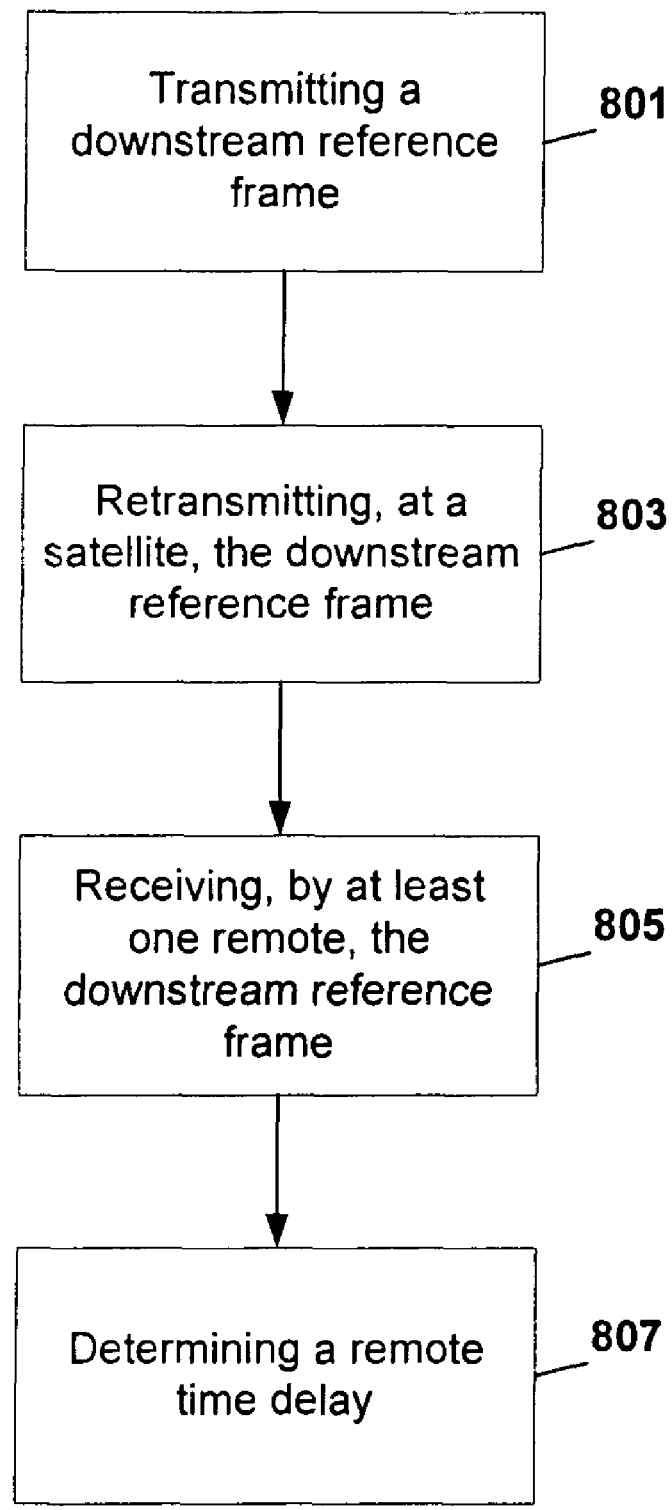
FIG. 8 is a flow diagram showing steps performed by a method for peer remote communication according to one embodiment of the invention.

A method for permitting peer remote communication is shown with regard to FIG. 8. At 801, a downstream reference frame is transmitted from a hub, at 803, the downstream reference frame is retransmitted by the satellite to a plurality of remotes, at 805 the downstream data from the hub via the satellite is received by at least one remote and the at least one remote transmits an upstream reference frame to the hub or the other remotes, and at 807 the delay (M) is determined as a difference between (i) a time of arrival, at the at least one remote, of the downstream reference frame, and (ii) a time of arrival, at the at least one remote, of the upstream reference frame after being reflected by the satellite back to the at least one remote.

The above discussed method is not limited to satellite communications but also applies to communication networks with variable elapsed time between a hub and remotes or remote-to-remote communications.

Numerous modifications and variations of the present invention are possible in light of the above teachings. It is therefore to be understood that within the scope of the appended claims, the invention may be practiced otherwise than as specifically described herein.

What is claimed is:

1. A communication system comprising:
a hub;
a repeater;
a scheduling unit; and
a remote,
the scheduling unit is configured to synchronize a communication of the system based on an elapsed time M between (i) an arrival at the remote of a downstream reference frame transmitted by the hub and retransmitted by the repeater, and (ii) an arrival at the remote of an upstream frame transmitted by the remote and retransmitted by the repeater, and
the scheduling unit is configured to determine the elapsed time or receive a signal with information regarding the elapsed time, and the elapsed time M is calculated as:

$$M = \mathrm{mod}((H-LB), \mathrm{sym\_per\_frame}),$$

wherein sym_per_frame is a number of symbols per frame, H is a hub-to-remote loop back time, and LB is a hub-to-hub loop back time.

2. The communication system of claim 1, wherein the repeater is an earth orbit satellite.

3. The communication system of claim 1, wherein the scheduling unit is at the hub.

4. The communication system of claim 1, wherein the scheduling unit is at the remote.

5. The communication system of claim 1, the system further comprising:
   another remote; and
   the scheduling unit is further configured to synchronize a communication between the remote and the other remote based on the elapsed time M.

6. The communication system of claim 1, wherein the hub-to-remote loop back time is a time elapsed between (i) a time of sending the downstream reference frame from the hub, and (ii) a time of arrival, at the hub, of the upstream reference frame sent by the remote via the repeater.

7. The communication system of claim 6, wherein the hub-to-hub loop back time is a time elapsed between (i) the time of sending the downstream reference frame from the hub, and (ii) a time of arrival, at the hub, of the downstream reference frame after being retransmitted by the repeater back to the hub.

8. A satellite communication system comprising:
   a hub having a scheduling unit and configured to transmit a downstream reference frame;
   a satellite; and
   at least one remote, wherein
   the satellite is configured to retransmit the downstream reference frame received from the hub to the at least one remote, and retransmit an upstream reference frame received from the at least one remote to the at least one remote and the hub,
   the scheduling unit or the at least one remote is configured to determine a remote time delay M as a difference between (i) a time of arrival, at the at least one remote, of the downstream reference frame, and (ii) a time of arrival, at the at least one remote, of the upstream reference frame after being retransmitted by the satellite back to the at least one remote, and
   the scheduling unit or the at least one remote is configured to determine the difference or receive a signal with information regarding the difference, and synchronize communications of the system based on the remote time delay M, calculated as:

$$M = \mathrm{mod}((H-LB), \mathrm{sym\_per\_frame}),$$

wherein sym_per_frame is a number of symbols per frame, H is a hub-to-remote loop back time, and LB is a hub-to-hub loop back time.

9. The satellite communication system of claim 8, further comprising other remotes, wherein the hub or the at least one remote transmits the remote time delay M to the other remotes.

10. The satellite communication system of claim 8, further comprising:
    a processing unit configured to calculate a hub-to-remote loop back time delay as a difference between (i) a time of sending the downstream reference frame from the hub, and (ii) a time of arrival, at the hub, of the upstream reference frame sent by the at least one remote via the satellite.

11. The satellite communication system of claim 10, wherein the processing unit is configured to calculate a hub-to-hub loop back time as a difference between (i) the time of sending the downstream reference frame from the hub, and (ii) a time of arrival, at the hub, of the downstream reference frame after being retransmitted by the satellite back to the hub.

12. The satellite communication system of claim 11, wherein the processing unit calculates the remote time delay M periodically.

13. The satellite communication system of claim 8, wherein the satellite communication system includes a mesh network.

14. The satellite communication system of claim 11, wherein the remote time delay M changes with a movement of the satellite.

15. The satellite communication system of claim 8, wherein the downstream reference frame uses Single Channel Per Carrier (SCPC) and the upstream reference frame uses Time Division Multiple Access (TDMA).

16. A communication apparatus that communicates with at least one remote via a satellite, comprising:
    a transmitter configured to transmit a downstream reference frame;
    a receiver configured to receive an upstream reference frame from the at least one remote; and
    a scheduling unit configured to determine a remote time delay M as a difference between (i) a time of arrival, at the at least one remote, of the downstream reference frame, and (ii) a time of arrival, at the at least one remote, of the upstream reference frame after being retransmitted by the satellite back to the at least one remote, and
    the scheduling unit is configured to determine the difference or receive a signal with information regarding the difference, and synchronize communications based on the remote time delay M, calculated as:

$$M = \mathrm{mod}((H-LB), \mathrm{sym\_per\_frame}),$$

wherein sym_per_frame is a number of symbols per frame, H is a hub-to-remote loop back time, and LB is a hub-to-hub loop back time.

17. The communication apparatus of claim 16, wherein the transmitter transmits the remote time delay M to plural remotes.

18. The communication apparatus of claim 16, further comprising:
    a processing unit configured to calculate a hub-to-remote loop back time delay as a difference between (i) a time of sending the downstream reference frame from the transmitter, and (ii) a time of arrival at the receiver of the upstream reference frame sent by the at least one remote via the satellite.

19. The communication apparatus of claim 18, wherein the processing unit is configured to calculate a hub-to-hub loop back time as a difference between (i) the time of sending the downstream reference frame from the transmitter, and (ii) a time of arrival, at the receiver, of the downstream reference frame after being retransmitted by the satellite.

20. The communication apparatus of claim 19, wherein the processing unit calculates the remote time delay M periodically.

21. The communication apparatus of claim 19, wherein the remote time delay M changes with a movement of the satellite.

22. The communication apparatus of claim 16, wherein the downstream reference frame uses Single Channel Per Carrier (SCPC) and the upstream reference frame uses Time Division Multiple Access (TDMA).

23. A non-transitory computer readable media storing computer program instructions, which when executed by a computer, cause the computer to perform the following steps: transmitting from a hub a downstream reference frame; retransmitting, at a satellite, the downstream reference frame to at least one remote, and an upstream reference frame sent by the at least one remote to the at least one remote and the hub; receiving at the at least one remote the downstream reference frame from the hub via the satellite; determining, at the hub or at the at least one remote, a remote time delay M as a difference between (i) a time of arrival, at the at least one remote, of the downstream reference frame, and (ii) a time of arrival, at the at least one remote, of the upstream reference frame after being retransmitted by the satellite back to the at least one remote, and the hub or the at least one remote determines the difference or receives a signal with information regarding the difference, and the remote time delay M is determined as M=mod((H−LB), sym_per_frame), in which sym_per_frame is the number of symbols per frame, H is the hub-to-remote loop back time, and LB is the hub-to-hub loop back time; and synchronizing communications of the at least one remote with another remote based on the determined remote time delay M.

24. The computer readable media of claim 23, further comprising:
transmitting the remote time delay M to a plurality of remotes.

25. The computer readable media of claim 23, further comprising:
calculating a hub-to-remote loop back time as a difference between (i) a time of sending the downstream reference frame from the hub, and (ii) a time of arrival, at the hub, of the upstream reference frame sent by the at least one remote via the satellite.

26. The computer readable media of claim 25, further comprising:
calculating a hub-to-hub loop back time as a difference between (i) the time of sending the downstream reference frame from the hub, and (ii) a time of arrival, at the hub, of the downstream reference frame after being retransmitted by the satellite back to the hub.

27. The computer readable media of claim 26, further comprising:
calculating the remote time delay M periodically.

28. The computer readable media of claim 23, further comprising:
transmitting the downstream reference frame using Single Channel Per Carrier (SCPC) and the upstream reference frame uses Time Division Multiple Access (TDMA).

29. A method for peer remote communication, comprising:
transmitting from a hub a downstream reference frame;
retransmitting, at a satellite, the downstream reference frame to at least one remote, and an upstream reference frame sent by the at least one remote to the at least one remote and the hub;
receiving at the at least one remote the downstream reference frame from the hub via the satellite;
determining, at the hub or at the at least one remote, a remote time delay M as a difference between (i) a time of arrival, at the at least one remote, of the downstream reference frame, and (ii) a time of arrival, at the at least one remote, of the upstream reference frame after being retransmitted by the satellite back to the at least one remote, and the hub or the at least one remote determines the difference or receives a signal with information regarding the difference, and the remote time delay M is determined as $M=\mathrm{mod}((H-LB), \mathrm{sym\_per\_frame})$ in which sym_per_frame is the number of symbols per frame, H is the hub-to-remote loop back time, and LB is the hub-to-hub loop back time; and
synchronizing communications of the at least one remote with another remote based on the determined remote time delay M.

* * * * *